Patented Oct. 2, 1934

1,975,408

UNITED STATES PATENT OFFICE 1,975,408

MOTHPROOFING MEDIA

Wilhelm Schepss, Leverkusen, near Cologne, and Max Hardtmann, Wiesdorf, Germany, assignors to I. G. Farbenindustrie Aktiengesellschaft, Frankfort-on-the-Main, Germany, a corporation of Germany No Drawing. Application November 20, 1929, Serial No. 408,663. In Germany November 24, 1928

5 Claims. (Cl. 260—124)

The present invention relates to new media for protecting wool, furs, feathers, hairs and the like from attack by animal textile pests, especially moths.

In accordance with the invention materials liable to attack by moths or other animal textile pests, such as hairs, feathers, furs, wool and the like can be protected from the attack by such pests, by incorporating therewith a thiourea of the probable general formula

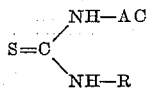

wherein R means an alkyl-, alkylene-, cycloalkyl-, aralkyl or aryl residue, AC. stands for the residue of an organic carboxylic acid.

The manufacture of such thiourea derivatives may be carried out by dissolving or distributing a compound of the formula

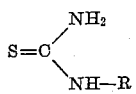

wherein R has the above designation, in a tertiary organic base (for example dimethylaniline) and causing a halide of the respective acid to enter the reaction mixture slowly at normal temperature, whereupon the reaction may be finished by gentle heating. The mixture is then cooled, acidified, the residue filtered, washed with water and recrystallized if desired. Colorless or weakly colored well crystallizing products are thus obtained, soluble in the usual organic solvents, such as alcohols, benzine, tetrachloromethane, cyclohexanone and the like.

We have prepared, tested and found efficacious against moths a large number of thioureas of the formula mentioned, as, for example, those in which R stands for alkyl, cyclohexyl, benzyl, phenyl, tolyl, chloro-tolyl, trichlorophenyl, naphthyl etc. and in which AC means the residue of such acids as acetic acid, ethoxy-acetic acid ($C_6H_5.O.CH_2.COOH$), ethylthioglycolic acid ($C_2H_5.S.CH_2.COOH$), valeric acid, capronic acid, oleic acid, benzoic acid or substitution products thereof, such as dichlorobenzoic acid, phenyl acetic acid, para chlorophenoxyacetic acid

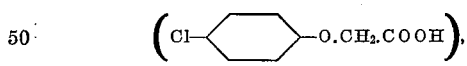

hexahydrobenzoic acid, naphthoic acids and the like.

The application of the new protective agents is effected in solution with a suitable organic solvent, especially one which is rather volatile, for instance, benzine, alcohol, tetrachloromethane, cyclohexanone and the like, with which solutions the material to be protected may be impregnated in any desired manner, for example by spraying, dipping or otherwise moistening it with the solutions. After evaporation the protective agent is tenaciously retained by the objects thus treated, which thereby are protected from attack by moths.

It may be mentioned that it is a great advantage of our protecting agents to be soluble in most cases also in easily volatile solvents such as benzine, tetrachloromethane and the like by which property the applicability of the products as protecting media obviously is facilitated. With this high solubility our products combine a strong protective power so that more textile fabrics impregnated with about 0.4–2% of the protective agents are completely moth proofed. In this respect and in view of their high solubility we prefer such products of the formula mentioned in which R means a cyclohexyl or an aromatic residue and AC stands for the residue of an organic carboxylic acid containing more than 4 carbon atoms and especially those which contain from 4 to 10 carbon atoms.

The following examples illustrate our invention without limiting it thereto:—

*Example 1.*—100 grams of wool are intensively moistened in any desired manner with a 10% solution of phenyl-valeryl-thiourea

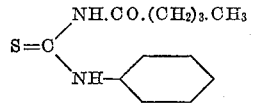

in tetrachloromethane or alcohol, after which the wool is pressed off until it still contains 10–20% of the impregnating solution and then dried. After this treatment the wool is permanently protected against attack by moths.

Instead of the valeryl compound the oleyl-, benzoyl-, dichlorobenzoyl-, and other similar derivatives of phenyl thiourea can be used with equal success.

*Example 2.*—100 grams of wool are sprayed with 10 grams of a 5% benzene solution of phenyl-capronyl-thiourea

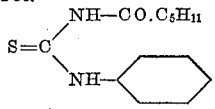

and dried. The material thus treated is moth proof. The above phenylcapronyl-thiourea can be obtained, for instance, by dissolving monophenyl-thiourea in dimethylaniline, adding to this solution a small surplus of a capronylchloride and then heating this reaction mass.

*Example 3.*—100 grams of wool, feathers, fur or of another material liable to attack by moths are intensively moistened with an 8% benzine solution of cyclohexyl-capronyl-thiourea

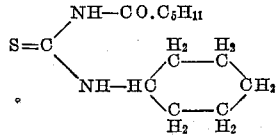

pressed off until still containing 10 grams of the impregnating solution and dried. The material is thus rendered unattackable by moths.

We claim:—

1. As moth proofing media the compounds of the general formula

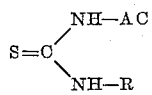

wherein AC stands for the residue of an organic carboxylic acid and R means an alkyl-, alkylene-, cycloalkyl-, aralkyl-, or aryl residue.

2. As moth proofing media the compounds of the formula

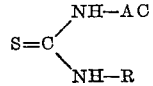

wherein AC means the residue of an aliphatic carboxylic acid containing between 4 and 10 carbon atoms, R stands for an aromatic or cyclohexyl residue.

3. As moth proofing medium the compound of the formula

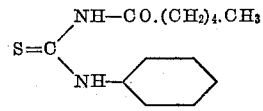

4. As a moth-proofing medium the compound of the formula:

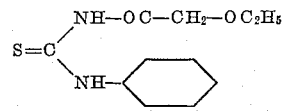

5. As a moth-proofing medium the compound of the formula:

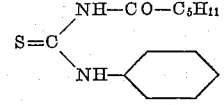

WILHELM SCHEPSS.
MAX HARDTMANN.